US007988087B1

(12) United States Patent
Tonks et al.

(10) Patent No.: US 7,988,087 B1
(45) Date of Patent: Aug. 2, 2011

(54) VTOL AIRCRAFT NOZZLE

(75) Inventors: Robert C Tonks, Bristol (GB); Philip A Mansfield, Bristol (GB); Leslie R Harper, Bristol (GB)

(73) Assignee: Rolls-Royce plc, London (GB)

( * ) Notice: Subject to any disclaimer, the term of this patent is extended or adjusted under 35 U.S.C. 154(b) by 1826 days.

(21) Appl. No.: 08/634,594

(22) Filed: Apr. 25, 1996

(30) Foreign Application Priority Data

May 30, 1995 (GB) ................................. 9510892.4

(51) Int. Cl.
B64C 29/00 (2006.01)
(52) U.S. Cl. .................................. 244/12.5; 239/265.11
(58) Field of Classification Search .................. 244/12.1, 244/12.4, 12.5, 56, 23 D, 52, 207, 23 A, 23 B; 239/265.19, 265.39, 265.41, 265.35; 60/228, 60/229, 230, 232
See application file for complete search history.

(56) References Cited

U.S. PATENT DOCUMENTS

| | | | | |
|---|---|---|---|---|
| 3,333,793 A * | 8/1967 | Opfer, Jr. et al. | ................ | 244/52 |
| 3,442,455 A * | 5/1969 | Smale | ...................... | 239/265.39 |
| 3,581,995 A * | 6/1971 | Fischer | ..................... | 239/265.11 |
| 3,912,201 A * | 10/1975 | Bradbury | ..................... | 244/23 D |
| 4,116,405 A * | 9/1978 | Bacchi et al. | ................ | 244/12.4 |
| 4,848,664 A * | 7/1989 | Thayer | ..................... | 239/265.29 |
| 4,978,071 A * | 12/1990 | MacLean et al. | ........ | 239/265.19 |
| 5,115,996 A * | 5/1992 | Moller | ......................... | 244/12.5 |
| 5,170,964 A * | 12/1992 | Enderle et al. | .................. | 244/52 |
| 5,261,604 A * | 11/1993 | Meyer | .................... | 239/265.19 |
| 5,351,911 A * | 10/1994 | Neumayr | ..................... | 244/23 C |
| 5,407,150 A * | 4/1995 | Sadleir | ......................... | 244/12.4 |
| 5,687,907 A * | 11/1997 | Holden | .................... | 239/265.35 |

FOREIGN PATENT DOCUMENTS

| GB | 878472 | 9/1961 |
|---|---|---|
| GB | 1184315 | 3/1970 |
| GB | 2230240 | 10/1990 |

* cited by examiner

*Primary Examiner* — Christopher P Ellis
(74) *Attorney, Agent, or Firm* — Oliff & Berridge, PLC

(57) ABSTRACT

A nozzle arrangement for a VTOL or STOVL aircraft having an airframe mounted lift system comprises a hinged deflector door pivotally mounted on the underside of the airframe for exhaust efflux deflection. The door is movable about its axis to vector impinging exhaust gases rearwards during the transition between vertical and horizontal flight, and in addition comprises a pair of lateral sidewalls which are movable in the plane of the door to direct the exhaust efflux sideways for improved aircraft yaw control.

7 Claims, 2 Drawing Sheets

Fig.1.
Fig.2.
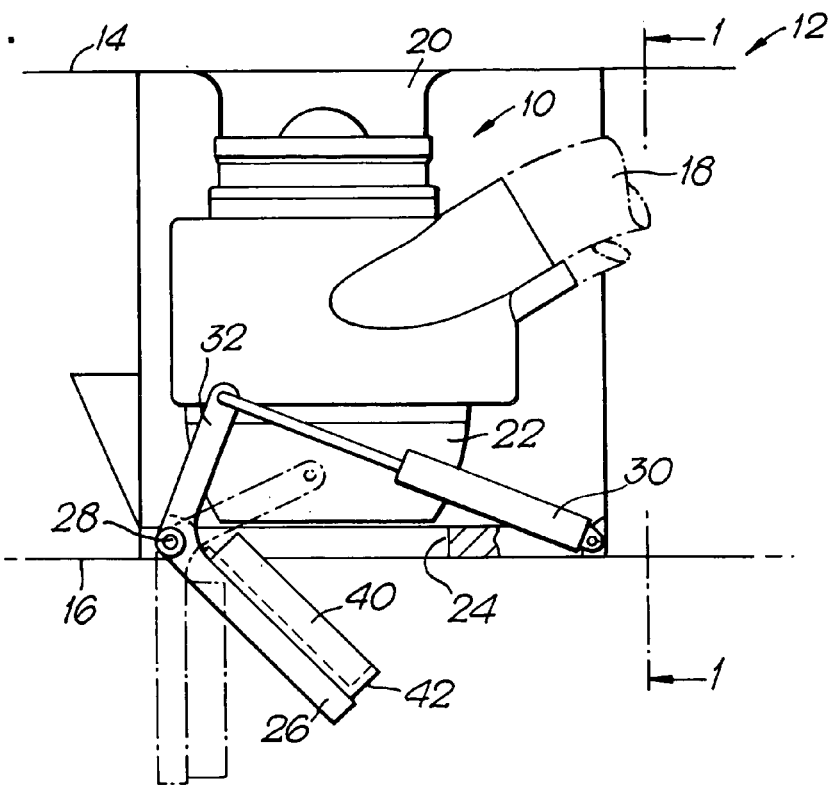
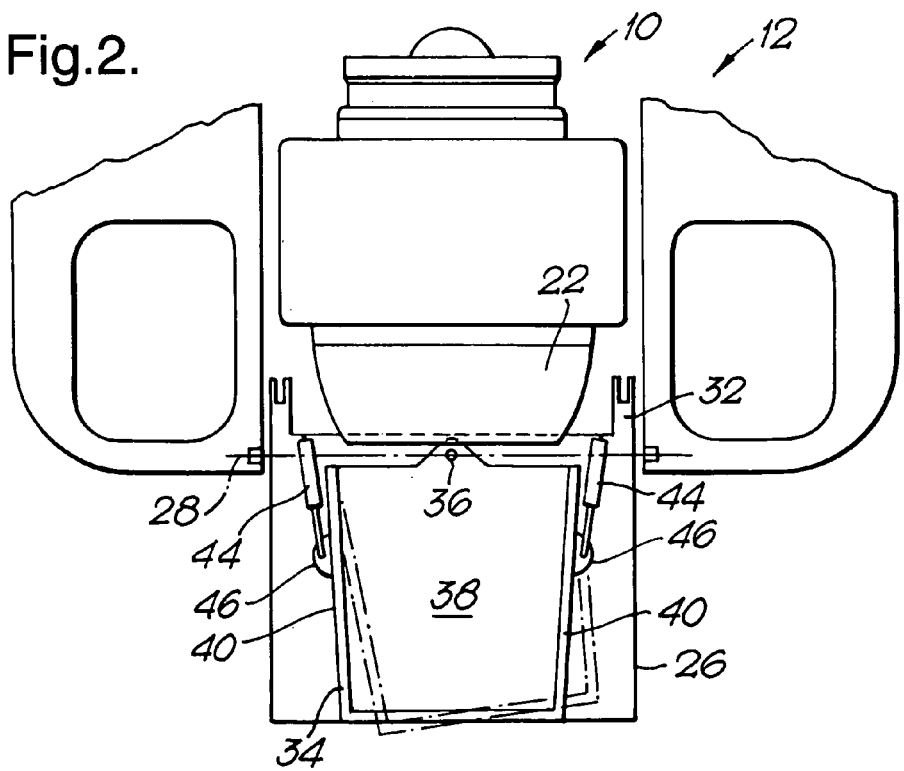

VTOL AIRCRAFT NOZZLE

This invention relates to an airframe/nozzle arrangement for Vertical Take-Off and Landing (VTOL) or Vertical/Short Take-Off and Landing (V/STOL) aircraft.

In particular the invention is concerned with the integration of such a nozzle in a VTOL or V/STOL airframe having a dedicated propulsion system for generating vertical lift, for example, an airframe mounted lift fan or lift engine.

A basic requirement of any vertical lift system is the capability of the system to vector exhaust efflux. The degree of thrust vectoring required will usually depend upon the particular aircraft application, but in arrangements which utilise one or more dedicated lift units for vertical thrust there is usually a requirement to provide at least a 45 degree aft vectoring capability, this degree of thrust vectoring being necessary for the transition between forward and vertical flight. In a number of proposed arrangements the addition of a conventional vectorable nozzle at the lift unit exit provides the necessary thrust vectoring capability.

In VTOL aircraft arrangements which utilise dedicated airframe mounted lift devices such as lift fans or engines, there is often insufficient space between the lift fan or engine and the airframe structure to accommodate a conventional vectorable nozzle without first having to compromise nozzle design and vectoring range. One way around this problem has been to integrate the nozzle function into the airframe structure.

In a known arrangement a dedicated lift unit, which may a lift fan or engine, is mounted vertically within a VTOL airframe. Intake doors are provided on the upper surface of the airframe to provide an air inlet, and a deflector door is hinged to the underside of the airframe to provide a gas stream exhaust efflux deflector. The lift unit is positioned directly above the deflector so that, in use, the exhaust efflux may be directed rearwards by selective movement of the door. Spillage of the impinging efflux is prevented by the provision of a pair of fixed parallel sidewalls which act to constrain the flow in the rearward direction of the door.

A drawback with this arrangement is that the deflector is limited to rearward vectoring. There is no provision for directing the exhaust efflux sideways for improved aircraft yaw control.

Accordingly, the present invention has for an objective improvements to the yaw control characteristics of VTOL type aircraft having dedicated lift devices in combination with deflector door type nozzles. In particular it is an object of the present invention to provide an airframe deflector door type nozzle which has both a rearward and sideward thrust vectoring capability.

According to the invention there is provided an airframe/nozzle arrangement for a VTOL or STOVL aircraft having an airframe mounted propulsive system for generating vertical lift, the arrangement comprising a hinged deflector door pivotally mounted on the underside of the airframe for exhaust efflux deflection, the deflector being provided with a pair of lateral sidewalls which are movable in the plane of the door to direct the efflux sidewards for aircraft yaw control.

Preferably the sidewalls are movable with respect to the deflector door. The sidewalls may be pivotally mounted with respect to the door and connected together for co-ordinated pivotal movement.

The sidewalls may each define one side of a movable yaw deflector pivotally mounted to the deflector door. The yaw deflector may comprise a tray type structure which lies flat against the defector door for exhaust efflux impingement, or a hollow frame type structure which lies flat against the deflector door, the frame being hollow in the region of exhaust efflux impingement.

Alternatively the sidewalls may be pivotally mounted in spaced apart relation to opposing sides of the deflector door, and linked together by means of a connecting element to form a parallelogram type linkage for co-ordinated pivotal movement of the sidewalls. In addition the connecting element may lie within a channel formed in the door.

Preferably the downstream edge of the deflector is angled relative to the main region of the door, thereby to direct the exiting exhaust efflux further in the aftward direction of the airframe.

The invention will now be described in greater detail, by way of example only, with reference to the accompanying drawings, in which:

FIG. 1 is a partial side view of VTOL airframe having a propulsive lift system in combination with a deflector door type nozzle of the present invention;

FIG. 2 is a forward section view in the direction 1-1 of the nozzle arrangement shown in FIG. 1;

Figure 3:
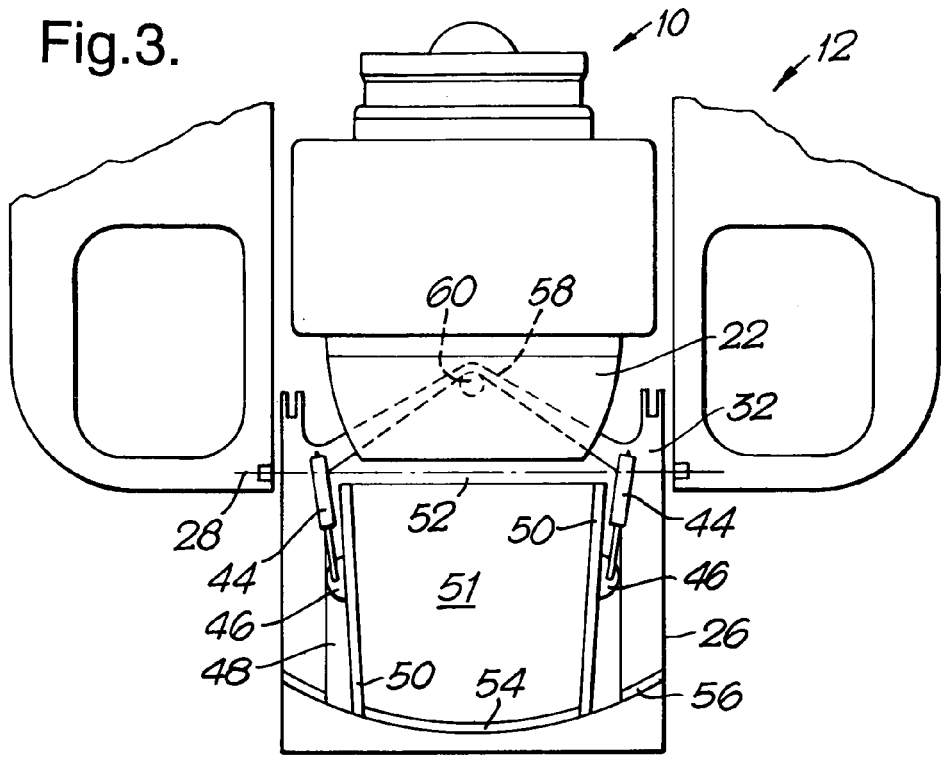
FIG. 3 shows a nozzle arrangement according to a second embodiment of the invention, also in the forward direction 1-1 of FIG. 1.

With reference to FIG. 1, a dedicated lift unit 10 is mounted vertically within a VTOL airframe 12 between an upper airframe surface 14 and a lower surface 16. In the example shown the lift unit 10 comprises a gas driven lift fan which is adapted to receive turbine exhaust gases diverted from the main aircraft propulsion system (not shown) along ducting 18 to drive an turbine integral with the fan. In use the lift fan receives air from an intake opening 20 formed in the upper aircraft surface by the selective deployment of airframe mounted intake doors (also not shown). Air entering the fan is first compressed then mixed with the diverted turbine gases driving the fan. The high pressure high temperature gases are then expanded through a discharge nozzle 22 prior to exiting the airframe through an opening 24 formed in the lower surface 16 by the selective deployment of a hinged airframe door 26.

The door 26 is hinged at the forward end of the opening 24 (to the left of the drawing in FIG. 1) about an axis 28 perpendicular to the main longitudinal axis of the airframe. The door is selectively movable between a fully open position (as indicated by the dashed lines in FIG. 1), and a closed position flush with the airframe surface 16. The door is movable by means of a pair of linear actuators 30. The actuators 30 are mounted on opposing sides of the opening opposite the hinge axis 28. Each actuator 30 is attached to the distal end of a bell crank lever 32 extending from and integral with the door 26. In use energisation of the actuators 30 causes the door 26 to deploy to the vertical or dashed line position for vertical lift, or to some intermediate position (as indicated by the solid lines in FIG. 1) for rearward vectoring of the lift fan efflux.

With reference to FIG. 2, the door 26 further comprises an impingement tray type structure 34 pivotally mounted to the door at a single point 36. The tray 34 comprises a main body portion 38 for impingement of the gas stream efflux, and a pair of lateral sidewalls 40 to prevent spillage of the impinging gases. The tray is arranged to lie flat against the door so that the reaction loads created by the impinging gases are reacted directly by the door 26 and actuators 30. The sidewalls are joined at their downstream end by means of an additional sidewall or kicker plate member 42 which has the effect of causing additional aftward redirection of the impinging gas flow. The downstream sidewall 42 may be angled relative to the main impingement portion of the tray, or as in FIG. 1 arranged perpendicularly.

A pair of linear actuators 44 are provided for moving the tray 34 in the plane of the door 26. The actuators are positioned on opposite sides of the door adjacent the sidewalls 40. At one end the actuators are hinged to the door 26 and at the other to lugs 46 integral with the sidewalls 40.

During operation synchronous movement of the actuators causes the tray and hence integral sidewalls 40 to move relative to the door. The tray is caused to move in the plane of the door about the pivot 36. This movement causes the thrust produced by the exiting gases to be directed sidewards, as well as rearwards, for aircraft yaw control. Obviously the degree of yaw control will depend upon the positioning of the lift fan unit within the airframe structure, but for most applications it is intended that only a moderate sidewards vectoring capability of +/−10 degrees, for example, will be required for adequate control.

FIG. 3 shows the same basic nozzle arrangement as FIG. 2, but modified in accordance with a second embodiment of the invention, the same reference numerals being used for the same parts throughout. In FIG. 3 the impingement tray 38 has been replaced by a lightweight movable frame 48. The frame comprises a pair of lateral sidewalls 50 which extend in spaced apart relation between an impingement region 51 of the door 26. The sidewalls are joined at one end by an upstream or forward triangular portion 52, and at the other by means of an arcuate downstream cross-member 54. The sidewalls 50 and triangular portion 52 are arranged to lie flat against the door surface whereas the cross-member 54 engages a correspondingly shaped arcuate guide channel 56 formed in the door surface. The cross-member may protrude outwards from the guide 56 to provide an additional downstream sidewall for additional rearward vectoring, or may lie flush with the guide to prevent further flow disturbance.

The frame is pivoted to a corresponding triangular portion 58 of a modified aircraft door 26 at apex 60. A pair of linear actuators 44 are provided, one on each side of the door, for moving the frame about it's pivot location 60. The actuators are mounted in an identical manner to the actuators 44 in FIG. 2 and may be operated in a similar manner to cause the lift fan exhaust efflux to be vectored sidewards for aircraft yaw control.

Figure 4:
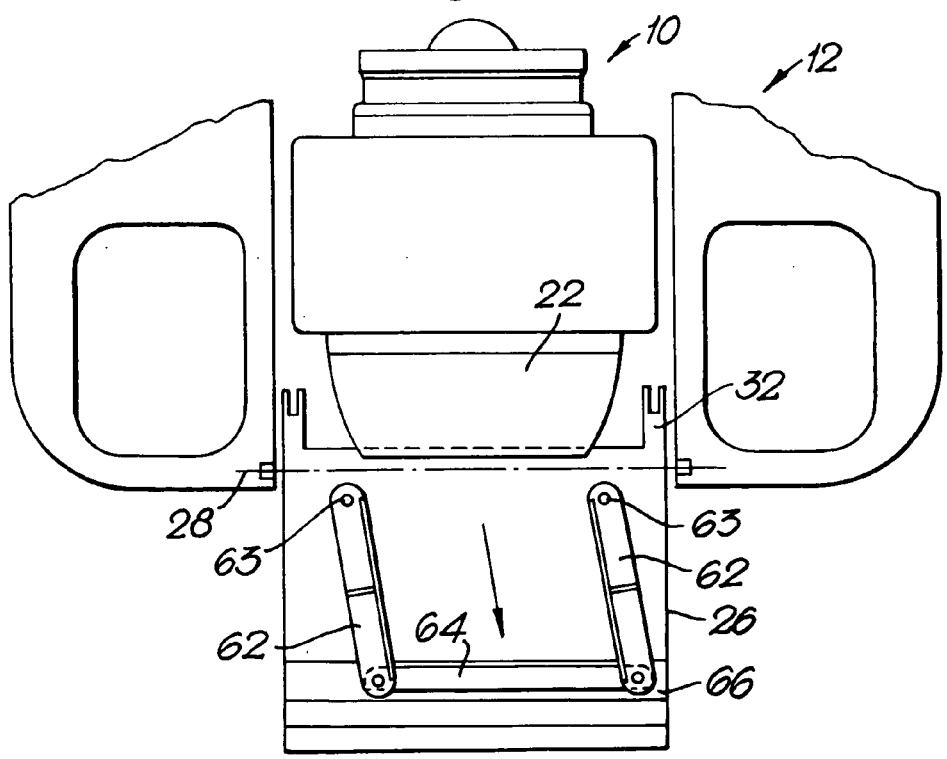
FIG. 4 shows a further alternative nozzle arrangement according to a third embodiment of the invention, again in the forward direction 1-1 of FIG. 1.

In FIG. 4 the sidewards vectoring function is provided by a pair of laterally spaced L-shaped sidewall elements 62, each pivotally mounted to the aircraft door 26 at a respective pivot location 63. The sidewalls are mounted to the door 26 at one end and connected to a common translatable link element 64 at the other. In combination the sidewalls 62 define two sides of a parallelogram linkage with the link 64 defining a third. The sidewalls 62 are mounted flush with the door surface so that the upstanding sidewall flanges of the L-shaped section elements extend perpendicular to the door. The interconnecting link 64 is arranged to lie within an oversized guide channel 66 formed in the downstream end of the door. The link may be dimensioned such that it provides an additional sidewall at the downstream end of the door for additional rearward vectoring.

One or more actuators (not shown) may be housed within the guide channel 66 for effecting movement of the linkage for sidewards deflection of the impinging gas efflux. In a similar manner to the embodiment of FIG. 3 this arrangement provides for the direct impingement of the lift fan efflux on the aircraft nozzle door. As in the FIG. 3 embodiment this provides for both a lightweight and compact nozzle construction.

The invention claimed is:

1. An airframe/nozzle arrangement for a VTOL or STOVL aircraft having an airframe mounted propulsive system for generating vertical lift, the arrangement comprising a discharge nozzle and exit opening in an underside of the airframe, a hinged deflector door pivotally mounted on the underside of the airframe for exhaust efflux deflection, the deflector door being provided with a pair of lateral sidewalls which are pivotally movable with respect to the deflector door and connected for co-ordinated pivotal movement, wherein the sidewalls each define one side of a pivotally movable yaw deflector to direct the efflux sidewards for aircraft yaw control.

2. An airframe/nozzle arrangement as claimed in claim 1 wherein the lateral sidewalls are connected by a tray structure which lies flat against the deflector door.

3. An airframe/nozzle arrangement as claimed in claim 1 wherein the lateral sidewalls comprise a hollow frame type structure which lies flat against the deflector door, the frame being hollow in the region of exhaust efflux impingement.

4. An airframe/nozzle arrangement as claimed in claim 3 wherein the sidewalls are joined at their respective downstream ends by a member which engages a guide formed in the deflector door.

5. An airframe/nozzle arrangement as claimed in claim 1 wherein the sidewalls are pivotally mounted in spaced apart relation to opposing sides of the deflector door, and are linked together by means of a connecting element to define a parallelogram linkage for co-ordinated pivotal movement for aircraft yaw control.

6. An airframe/nozzle arrangement as claimed in claim 5 wherein the connecting element lies within a channel formed in the deflector door.

7. An airframe/nozzle arrangement as claimed claim 1 wherein the downstream edge of the deflector door is angled relative to a remainder of the deflector door to direct the exiting exhaust efflux further in the aftward direction of the airframe.

* * * * *